United States Patent [19]
Breen et al.

[11] Patent Number: 5,879,784
[45] Date of Patent: Mar. 9, 1999

[54] TICKETS WITH EXTRUDED SECURITY STRIPE AND METHOD OF MAKING SAME

[75] Inventors: Thomas J. Breen, Northbrook, Ill.; Christian K. Oelsner, Brentwood, Tenn.

[73] Assignee: Docusystems Inc., Morton Grove, Ill.

[21] Appl. No.: 768,217

[22] Filed: Dec. 17, 1996

[51] Int. Cl.⁶ .................................. B32B 5/16; B05D 5/00
[52] U.S. Cl. .................... 428/195; 428/206; 428/207; 428/208; 428/211; 428/328; 428/332; 428/336; 428/340; 428/537.5; 428/900; 283/72; 156/244.11; 156/244.24; 156/244.25; 427/286; 427/288; 427/372.2
[58] Field of Search ................................ 283/72, 95, 100, 283/901, 903; 430/138; 428/195, 411.1, 206, 207, 208, 211, 323, 328, 332, 336, 340, 537.5, 900; 427/256, 286, 288, 372.2; 156/244.11, 244.24, 244.25

[56] References Cited

U.S. PATENT DOCUMENTS

| | | | |
|---|---|---|---|
| 4,677,285 | 6/1987 | Taniguchi | 235/488 |
| 4,677,553 | 6/1987 | Roberts et al. | 364/412 |
| 4,761,543 | 8/1988 | Hayden | 235/457 |
| 4,777,108 | 10/1988 | Adair | 430/138 |
| 5,088,737 | 2/1992 | Frank et al. | 273/138 |
| 5,599,046 | 2/1997 | Behm et al. | 283/83 |
| 5,681,065 | 10/1997 | Rua, Jr. et al. | 283/903 |

*Primary Examiner*—Marie Yamnitzky
*Attorney, Agent, or Firm*—Laff, Whitesel, Conte & Saret, Ltd.

[57] ABSTRACT

Documents bearing a thin reflective extruded security stripe comprising a leafing aluminum pigment having a gloss characteristic of from 20 to 24 as measured on a Gardner/BYK Microglass meter at a 60° angle. A water soluble dye may be incorporated in the stripe. A method of making the document and a dye containing leafing aluminum pigment for extrusion on the document are also disclosed.

26 Claims, 1 Drawing Sheet

TICKETS WITH EXTRUDED SECURITY STRIPE AND METHOD OF MAKING SAME

BACKGROUND OF THE INVENTION

Airlines and others continue to seek improved techniques for securing their tickets against counterfeiting and against fraudulent duplication and alteration. Because tickets can have substantial values, tickets remain a target for potential counterfeiters and forgers.

Accordingly, features which can be added to documents such as ticket stock and tickets which will prevent or deter their fraudulent alteration and counterfeiting or which will swiftly and easily indicate that forgery or counterfeiting may have occurred regarding such documents are important potential additions to such documents. That is particularly so if the features are of a relatively low cost, do not require special equipment to be associated with their use, do not alter the documents in ways which will interfere with the equipment with which they are normally used, and which can be employed with documents such as tickets which are otherwise conventional.

SUMMARY OF THE INVENTION

In accordance with the present invention, documents, such as improved tickets and ticket stock are provided which enhance deterrence of counterfeiting and forging of such documents.

A document of the present invention comprises a substrate, a reflective extruded security stripe on the substrate, the stripe being deposited from a composition comprising a leafing aluminum pigment and a binder, the stripe having a gloss characteristic of from about 20 to about 24 measured by a Gardner/BYK Microgloss meter at a 60° angle, the stripe being deposited at a dry weight of from about 10 to about 30 grams/square meter, the stripe having good adhesion to the substrate. The composition preferably further comprises a dye, and preferably a water soluble dye, so that when the stripe is rubbed with a moist swab, dye transfers from the stripe to the swab. In one form, the document further comprises a magnetic stripe on the substrate, such as an extruded magnetic stripe deposited on the substrate, positioned at a location spaced from the reflective extruded stripe.

Desirably the reflective extruded stripe bears a distinctive pattern, such as a repetitive embossed pattern. The reflective extruded stripe may comprise a pair of spaced-apart narrow stripe elements. Preferably the particulate material in the stripe is no more than about 15 microns in size.

The document may desirably be a ticket and the security stripe may have a thickness of from about 0.0003 to about 0.0006 inch.

In yet another aspect of the invention a method of making a ticket resistant to counterfeiting and forging is provided. It comprises the steps of providing a paper ticket stock substrate, preparing a composition comprising leafing aluminum pigment particles and a binder, extruding the composition and curing the composition in an elongated stripe having a gloss characteristic of from about 20 to about 24 as measured by a Gardner/BYK Microgloss meter at a 60° angle, the stripe being deposited at a dry weight of from about 10 to about 30 grams/square meter and having good adhesion.

The method preferably employs a composition including a dye. The dye may be water soluble so that when a deposited cured stripe is rubbed with a moist swab, dye transfers from the stripe to the swab. Desirably the method further comprises the step of providing a magnetic stripe on the substrate in a location spaced from and parallel to the composition stripe, and also comprises the further step of forming a distinctive pattern in the reflective stripe before curing the composition.

The invention further comprises a method of making a ticket resistant to counterfeiting and forging and comprising the steps of providing a paper ticket stock substrate, grinding a dye in an organic solvent in which it is not soluble until it is thoroughly wetted-out by the solvent and reduced to a very fine particle size of no more than 15 microns in any dimension, mixing a leafing aluminum pigment and a binder in an organic solvent, and then mixing the wetted-out dye therewith to produce an extrudable composition having a particle size of no more than 15 microns in any dimension, and then extruding the extrudable composition onto a ticket substrate along its length and curing the composition to produce a reflective security stripe having a gloss characteristic of from about 20 to about 24 as measured by a Gardner/BYK Microgloss meter at a 60° angle.

Further objects, features and advantages of the present invention will become apparent from the following description and drawings.

DETAILED DESCRIPTION

Figure 1:
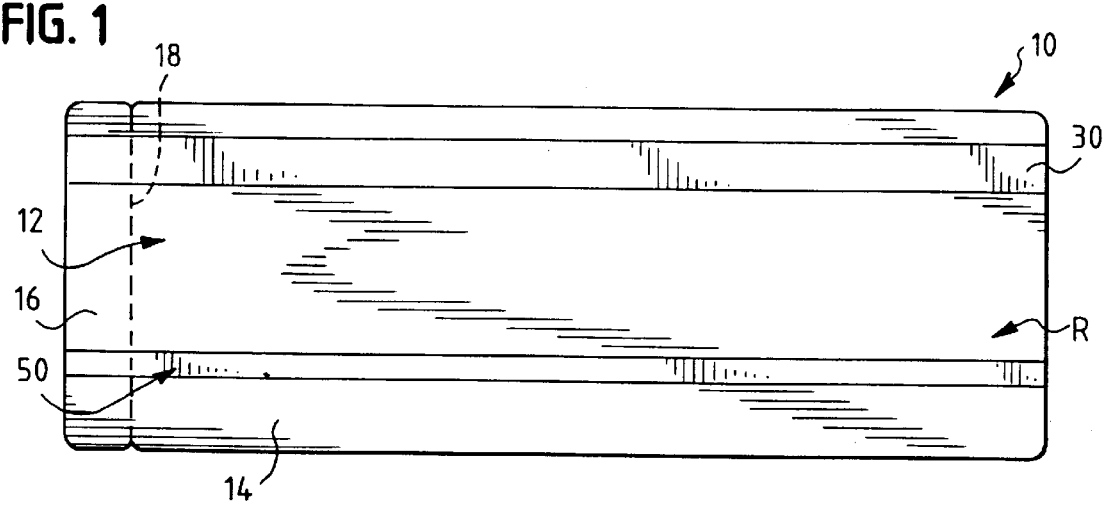
FIG. 1 is a rear plan view of a ticket made in accordance with the present invention.
Figure 2:
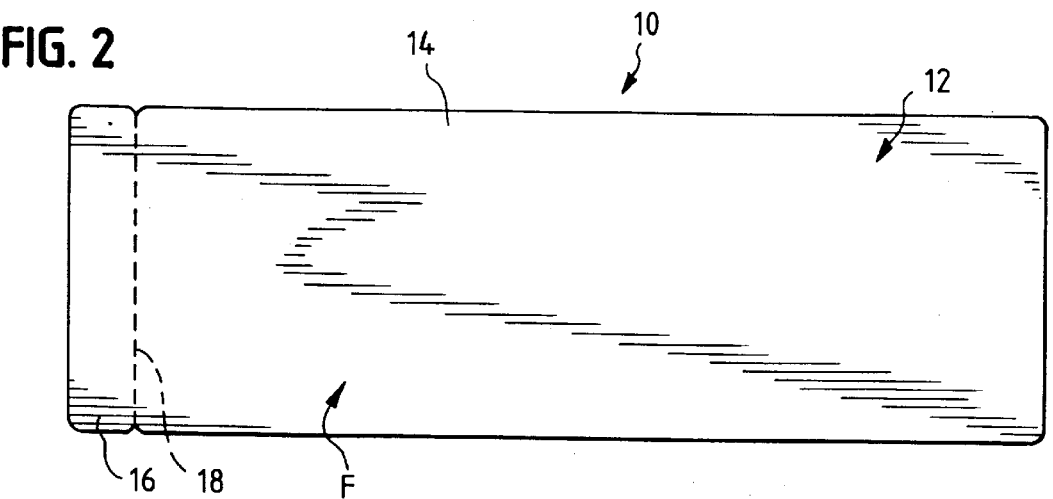
FIG. 2 is a front plan view of the ticket of FIG. 1.

Referring now to the drawings, a ticket 10 of the present invention includes a substrate 12. Ticket 10 may be an airline ticket, another transportation ticket, a coupon or other document having a value and which is desirably to be protected and provided with enhanced security. Substrate 12 may be a seven point, 99 pound basis paper. Substrate 12 may be approximately 7 mils in thickness, and may be about 3 ¼ inch by about 7 ⅜ inch. Ticket 10 comprises a ticket section 14 and a staple tab 16 from which the ticket section 16 may be separated along a line of serrations 18.

The front side F of the ticket may be conventional and includes printed indicia as well as zones for printing information specific to the particular ticket, such as destination, ticket price, customer name, etc.

The rear R of the ticket may include a typical magnetic stripe 30, such as one deposited by extrusion in a conventional manner. Magnetic stripe 30 may be recorded with desired information such as customer name, ticket number, etc., all as is known and conventional. Although the magnetic stripe 30 is illustrated as an extruded magnetic stripe, it may be deposited or provided in other ways, such as by application of a tape, etc.

Figure 4:
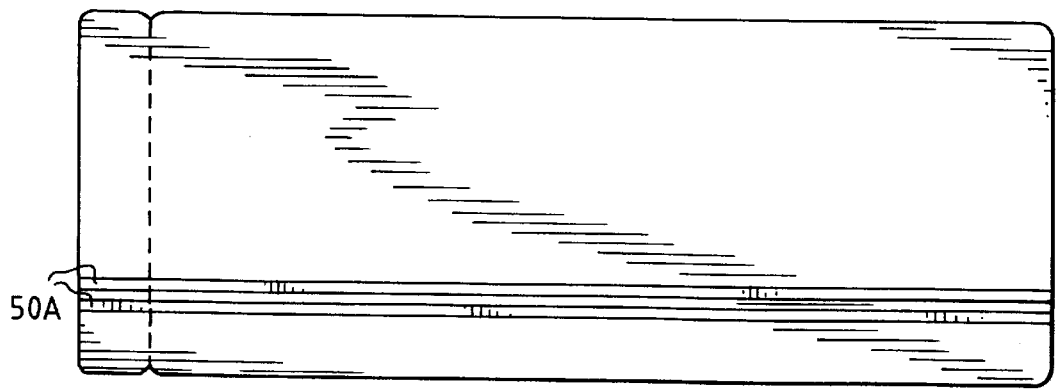
FIG. 4 is a rear plan view of a further embodiment of a ticket of the present invention.

The rear R of ticket 10 also bears a reflective security stripe 50 which is prepared and deposited in accordance with the present invention. Stripe 50 is deposited by extrusion and has characteristics which make it extremely difficult for counterfeiters to duplicate and forgers to alter without access to commercial extrusion equipment and to a commercial extrusion plant. It therefore provides enhanced security as compared to that which is available with current conventional printing technology. Especially when the extruded stripe is deposited as a dual or side-by-side stripe deposit as shown in FIG. 4 as stripe elements 50A with the typical thicknesses of extrusion deposited stripes, the security stripe becomes extremely difficult to duplicate by any other printing process.

Figure 3:
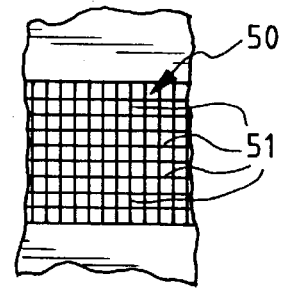
FIG. 3 is an enlarged plan view of a portion of FIG. 1.

The extruded stripe pattern on the rear R of the ticket desirably includes both the extruded magnetic stripe 30 and the spaced parallel extruded reflective stripe 50. Magnetic stripe 30 may have a width of about 0.64 inch, and the reflective stripe 50 may have a width of about 0.19 inch. In a dual reflective stripe-version, the pair of stripe elements 50A (FIG. 3) are each about 0.94 inch wide, with a space of about 0.062 inch between them.

Stripe 50 is deposited by extrusion. A typical suitable extrusion device is a slot extrusion coater with a 0.005 inch by about 3/16 inch opening or extrusion nozzle when the deposit is intended to be about 3/16 inch wide.

Stripe 50 is deposited from a composition which comprises an aluminum pigment in a binder, and may also include a water soluble dye. The stripe is deposited in a suitable vehicle which evaporates leaving a deposit of the aluminum pigment, binder and, if present, a water soluble dye. In a preferred form of the present invention, the aluminum pigment is a leafing aluminum pigment.

The extruded reflective stripe 50 is desirably very adhesive relative to the substrate of the ticket. As such it is virtually impossible to remove it entirely from the substrate without leaving evidence that such has been attempted, contributing to the extreme difficulty of alteration of an issued ticket of the present invention.

Because of the nature of the material comprising the stripe 50, the stripe is very fugitive, by which is meant that it lacks great cohesiveness. For that reason it tends to separate when an self-adhering adhesive tape is applied and is then pulled away. The fugitive nature of the stripe contributes to the extreme difficulty of altering an issued ticket of the present invention. Although this is a desirable attribute of the stripe, tickets and documents made in accordance with this invention need not necessarily employ formulations which produce stripes lacking cohesion.

In accordance with one embodiment of the invention a reflective security stripe 50 was deposited along the length of the ticket stock in a zone approximately 0.19 inch wide and in a dry-weight amount of about 22.5 grams/m$^2$. The stripe 50 was deposited from a thoroughly mixed composition comprising, by weight, the following:

|  | Percent by Weight |
| --- | --- |
| Acetone | 68.1% |
| VAGF binder | 16.6% |
| Leafing aluminum particles | 13.9% |
| Wetting Agent | 0.5% |
| Blue Dye Solution | 0.8% |
|  | 99.9% |

The VAGF binder resin was a vinyl resin in powder form from Union Carbide Corporation and is identified as "UCAR" Solution Vinyl VAGF. This contains 80.0 to 82.0% by weight of polyvinyl chloride and about 4% vinyl acetate and has a hydroxy content of 1.6 to 2.0% by weight. A 20 percent solution of the resin in a 50/50 mixture of methyl isobutyl ketone/toluene has a specific gravity of 225 to 350 centipoises. Another suitable binder is a polyester polyurethane resin available as Morthane CA-398NLV from Morton International, Inc., 1275 Lake Avenue, Woodstock, Ill. 60098. The wetting agent for assuring proper distribution of the dye was Triton X-100 from Union Carbide Corporation. Other binders and wetting agents may be used as well.

The leafing aluminum particles were Silvet 320-20-J aluminum particles available from Silberline Mfg. Co., Inc., R.D. 2 Hometown, Tamaqua, Pa. 18252. Silvet 320-20-J comprises a leafing aluminum pigment granule composition having a minimum of 78.0% aluminum pigment, 19.5% carrier and a minimum of 99.0% non-volatiles, and is available in a dry pelletized form. By the wet method screen analysis, a minimum of 99.0% of the Silvet 320-20-J will pass through a 325 mesh screen. The representative average particle size is 10.5 microns as determined by a Cilas granulometer. The carrier content of the pellets is an aldehyde resin.

As described herein, the aluminum pigment is a leafing aluminum pigment as distinguished from a non-leafing pigment, and is chosen to produce a gloss characteristic of from about 20 to about 24 in the finished stripe. This produces a reflective characteristic which will be easily determinable, both by machine and by the eye, such as by the eye of a ticket agent who is given the ticket for use or passage. If the reflective characteristic is different, the authenticity of the ticket will be called into question. Tickets having such reflective characteristics and which incorporate a dye as well can be made effectively only by an in-plant process, and cannot be reproduced by conventional printing processes, thus making counterfeiting and alteration by garage shops and individuals virtually impossible.

The blue dye solution in the preferred embodiment described herein was made from Pylam Direct Blue 199 Dye (12 pounds) and acetone (18.9 pounds) with an additional amount of acetone (16.5 pounds) used for washup of the mill. Pylam Direct Blue 199 Dye is available from Pylam Products Company, Inc., 1001 Stewart Avenue, Garden City, N.Y., 11530. To prepare the blue dye, the dye and acetone are ground, as in a jar mill with a 70% volume charge of 1/4 inch ball bearings for up to 6 hours. This results in a very fine grind and a thorough wetting out of the dye by the acetone. Failure to mix and grind thoroughly and to the point where the dye is wetted-out completely will result in flocculation when the dye is mixed later with the leafing aluminum particles and binder for deposit. Thus grinding and mixing must be thorough and complete. After grinding has been accomplished, the additional acetone is used to wash up the mill and to recover all of the dye. Then, before the finely ground dye is added to the leafing aluminum particle dispersion, the dye is mixed thoroughly to provide the proper formulation for extrusion of the stripe 50. Thorough mixing is important to assure the proper formulation because the dye is water soluble and is not soluble in the acetone. Other dyes and dye colors than Pylam Direct Blue 199 Dye may be used as well. It is also possible to use dyes which are not water soluble. It is important that the dye be effectively soluble in or wetted-out by a solvent or carrier other than the solvent used for the leafing aluminum pigment. Thus if the pigment solvent is acetone, the dye carrier or solvent should be something other than acetone, of which water is just one possibility.

The stripe 50 prepared and deposited as described has a shiny silvery appearance when cured. There is essentially no color visible to the eye imparted by the dye to the stripe; the stripe appears to be silvery. The particle size of the various particulate material in the slurry to be extruded is no greater than 15 microns.

The stripe is preferably deposited from a narrow single stream along the length of an ATB ticket. In one embodiment it may have a width of about 0.1875 inch centered on a line about 1.175 inch from the lower ticket edge. It extends along the entire length of the ticket including the staple tab 16. The stripe 50, when dry, preferably projects no more than 600 microinches from the surface of the substrate and, as such, has a thickness of no more than about 600 microinches (0.0006 inch). It is preferably deposited in a dry weight amount of about 10 to about 30 grams per square meter or an average of about 22.5 g/m², and in a thickness of from about 300 to 600 microinches. The aluminum particles are deposited in an amount of about 4.3 to about 13.1 g/m² and in one embodiment in an amount of about 9.8 g/m². The stripe 50 is sufficiently regular in both the longitudinal and transverse directions that it does not exceed 100 microinches centerline average in those directions as measured on a profilimeter with a cutoff wavelength of 0.8 mm and a probe with a maximum radius of 2.54 microns. The stripe 50 is sufficiently adherent and coherent so that 150,000 tickets bearing it may pass through a common ATB printer without adverse operating effect. The stripe gloss is preferably from about 20 to about 24 when measured on a Gardner/BYK Micro Gloss Meter or comparable meter at 60 degrees.

When a dye, such as the water soluble blue dye described, is used, its presence will signify that the stripe is genuine and has not been counterfeited or altered. The inclusion of the dye in the reflective stripe makes it even more difficult to counterfeit or alter tickets made in accordance with this invention. When a swab such as a cotton swab or napkin, paper towel or other swab moistened with tap water is rubbed against the stripe 50, a light blue residue will appear on the swab, while the surface of the stripe will remain shiny and silvery. Multiple rubbings beyond one or two rubbings in the same area will not be effective to produce a blue residue unless the stripe is abraded or altered, as with a knife. Such abrasion or alteration, or the failure of a rubbing to produce a blue residue, will call into question the authenticity of a document.

The technique of preparing a thoroughly wetted-out, finely ground dye for mixture with a particulate pigment dispersion, thereby to produce a residual color which may be observed by using a swab as just discussed, may be used with other particulate pigments, such as magnetic slurries as well. As such, a composition of a binder and magnetic particles (rather than leafing aluminum particles) of a particle size of no greater than 15 microns may be mixed with the wetted-out dye, just as described above. When this composition is extruded and cured, the stripe will function as will conventional magnetic stripes, but will also produce the tell-tale color on a water-moistened swab to provide an indication of the authenticity of the document.

To provide an additional level of security, the extruded stripe 50 may be patterned after it is deposited and prior to its curing. Thus, for example, an repetitive embossed pattern may be impressed, as by an impression roller, into the stripe. The pattern may be a grid pattern having a series of longitudinal and transverse lines 51 (see FIG. 3) which are embossed into the stripe 50 prior to curing or may be a design or any other pattern which may be selected. Or, for example, the pattern may be selected to coincide with the month of production, serial number ranges or other selected features. Such patterns may be impressed into extruded stripes, but cannot be readily produced in stripes produced by other techniques, such as stripes produced by conventional printing techniques.

In yet another form of the invention, the substrate may be imprinted with a ticket number or other indicia in the zone on which the extruded reflective stripe 50 is to be deposited. The reflective stripe is deposited over the imprinted indicia. That the ticket is genuine may then be confirmed by removing at least the reflective portions of the stripe in the zone of underprinting, as with self-adhering tape. Because of the poor cohesion of the reflective stripe material, self-adhering tape will tend to remove sufficient of the stripe to expose the portion of the stripe below the reflective aluminum particles. Because the dye and remainder of the stripe 50 is essentially transparent when the layer of reflective aluminum particles is removed, imprinted indicia below the remaining portions of the stripe will be visible.

It will be apparent to those skilled in the art that modifications may be made in the specific embodiments described herein without departing from the spirit and scope of the invention. As such the invention is not intended to be limited except as may be specifically required by the appended claims.

What is claimed is:

1. A ticket comprising
   a paper substrate,
   a reflective extruded security stripe on said substrate, said stripe being deposited from a composition comprising a leafing aluminum pigment and a binder, said stripe having a gloss characteristic of from about 20 to about 24 as measured on a Gardner/BYK Microgloss meter at a 60° angle, said stripe being deposited at a dry weight of from about 10 to about 30 grams/square meter, said stripe being adherent to the substrate.

2. The ticket of claim 1, and wherein said composition further comprises a dye.

3. The ticket of claim 2, and wherein said dye is a water soluble dye, whereby when said stripe is rubbed with a moist swab, dye transfers from the stripe to the swab.

4. The ticket of claim 2, and wherein all of the particulate material in said stripe is no more than about 15 microns in size.

5. The ticket of claim 1, and wherein said ticket further comprises a magnetic stripe on said substrate at a location spaced from said reflective extruded stripe.

6. The ticket of claim 5, and wherein said magnetic stripe is an extruded magnetic stripe.

7. The ticket of claim 1, and wherein said reflective extruded stripe bears a distinctive pattern.

8. The ticket of claim 7, and wherein said pattern is an embossed pattern.

9. The ticket of claim 7, and wherein said pattern is a repetitive pattern.

10. The ticket of claim 1, and wherein said stripe comprises a pair of spaced-apart stripe elements.

11. A document comprising a paper substrate, and on said substrate a magnetic recording stripe and a spaced parallel extruded elongated reflective stripe, said reflective stripe comprising leafing aluminum pigment and a binder and having a gloss characteristic of from about 20 to about 24 as measured on a Gardner/BYK Microgloss meter at a 60° angle, said reflective stripe having a thickness of from about 0.0003 to about 0.0006 inch and being adherent to the substrate.

12. The document of claim 11, and wherein said reflective stripe further comprises a dye.

13. The document in accordance with claim 12, and wherein said dye comprises a water soluble dye whereby, when said stripe is rubbed with a moist swab, dye transfers from the stripe to the swab.

14. The document in accordance with claim 12, and wherein all of the particulate material in said reflective stripe is no more than about 15 microns in size.

15. The document in accordance with claim 11, and wherein said extruded reflective stripe bears a distinctive pattern.

16. The document in accordance with claim 15, and wherein said reflective extruded stripe bears an embossed distinctive pattern.

17. The document in accordance with claim 14, and wherein said magnetic recording stripe comprises an extruded magnetic stripe deposited on said substrate at a location spaced from said reflective extruded stripe.

18. A method of making a ticket resistant to counterfeiting and forging comprising the steps of providing a paper ticket stock substrate, preparing a composition comprising leafing aluminum pigment particles, a vehicle which evaporates, and a binder, extruding said composition onto said substrate and curing said composition in an elongated stripe and evaporating said vehicle to leave a deposit of said aluminum pigment particles, said stripe having a gloss characteristic of from about 20 to about 24 as measured on a Gardner/BYK Microgloss meter at a 60° angle, said stripe being deposited at a dry weight of from about 10 to about 30 grams/square meter and being adherent to said substrate.

19. The method of claim 18, and wherein said composition further comprises a dye, said dye being effectively soluble in or wetted out by a solvent other than said vehicle.

20. The method of claim 19, and wherein said dye is a water soluble dye, whereby when a deposited cured stripe is rubbed with a moist swab, dye transfers from said stripe to said swab.

21. The method of claim 18, and further comprising the step of providing a magnetic stripe on said substrate in a location spaced from and parallel to said composition stripe.

22. The method of claim 21, and wherein said step of providing said magnetic stripe comprises extruding a magnetic stripe on said substrate.

23. The method of claim 18, and wherein said method comprises the further step of forming a distinctive pattern in said stripe before curing the composition.

24. The method of claim 18, and comprising the further steps of imparting a distinctive visible pattern to said stripe prior to curing said composition.

25. A method of making a ticket resistant to counterfeiting and forging comprising the steps of providing a paper ticket stock substrate, grinding a dye in an organic solvent in which it is not soluble until it is thoroughly wetted-out by the solvent and reduced to a very fine particle size of no more than 15 microns in any dimension, mixing a leafing aluminum pigment and a binder in an organic solvent, and then mixing said wetted-out dye therewith to produce an extrudable composition in which all of the particles in the composition have a particle size of no more than 15 microns in any dimension, and then extruding said extrudable composition onto a ticket substrate along its length and curing said composition to produce a reflective security stripe having a gloss characteristic of from about 20 to about 24 as measured on a Gardner/BYK Microgloss meter at a 60° angle.

26. The method of claim 25, and wherein said method further comprises the step of extruding a magnetic stripe onto said substrate along its length at a location spaced from said reflective stripe.

* * * * *

UNITED STATES PATENT AND TRADEMARK OFFICE
CERTIFICATE OF CORRECTION

PATENT NO. : 5,879,784
DATED : March 9, 1999
INVENTOR(S) : Thomas J. Breen; Christian K. Oelsner It is certified that error appears in the above-identified patent and that said Letters Patent is hereby corrected as shown below:

Column 7, line 7, delete "14" and insert --11--.

Signed and Sealed this

Tenth Day of August, 1999

Attest:

Attesting Officer

Q. TODD DICKINSON

Acting Commissioner of Patents and Trademarks